(12) United States Patent
Ziegler et al.

(10) Patent No.: US 7,498,774 B2
(45) Date of Patent: Mar. 3, 2009

(54) BATTERY PACK FOR HAND-HELD ELECTRIC MACHINE TOOLS

(75) Inventors: Bernd Ziegler, Hiltenfingen (DE); Bernd Heigl, Augsburg (DE); Stephan Krebs, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 247 days.

(21) Appl. No.: 11/170,347

(22) Filed: Jun. 29, 2005

(65) Prior Publication Data

US 2006/0001404 A1     Jan. 5, 2006

(30) Foreign Application Priority Data

Jun. 30, 2004   (DE) ................ 10 2004 031 601

(51) Int. Cl.
*H02J 7/06* (2006.01)
(52) U.S. Cl. ..................... 320/150; 320/122
(58) Field of Classification Search ............. 320/150, 320/154, 136, 134, 160; 324/431, 441
See application file for complete search history.

(56) References Cited

U.S. PATENT DOCUMENTS

| | | | |
|---|---|---|---|
| 5,708,350 A * | 1/1998 | Tibbs | 320/153 |
| 6,345,238 B1 * | 2/2002 | Goodwin | 702/130 |
| 6,362,600 B2 * | 3/2002 | Sakakibara | 320/150 |
| 6,653,814 B1 * | 11/2003 | Patino | 320/103 |
| 6,859,013 B2 * | 2/2005 | Howard et al. | 320/139 |
| 2001/0010455 A1 * | 8/2001 | Brotto et al. | 320/106 |
| 2004/0101744 A1 * | 5/2004 | Suzuki | 429/61 |

FOREIGN PATENT DOCUMENTS

| | | |
|---|---|---|
| EP | 0448767 A1 | 10/1991 |
| NL | 9201744 A | 5/1994 |

* cited by examiner

*Primary Examiner*—Akm E Ullah
*Assistant Examiner*—Nguyen Tran
(74) *Attorney, Agent, or Firm*—Abelman, Frayne & Schwab

(57) ABSTRACT

A battery pack (2) for an associated hand-held electric machine tool (1) and for an associated charging device (13) including an analog temperature sensor (3) with a negative temperature coefficient and a temperature measuring interface (4) accessible from the outside. Battery protection electronics (5) arranged in the hand-held electric machine tool (1) and in the charging device (13), which have a battery protection logic (6) and a power switch (8) that is arranged in the circuit path (7) of the battery pack (2) can be influenced. The battery pack (2) is provided with an emergency protection circuit (10), which is connected in parallel with the analog temperature sensor (3) and which, in emergency situations, can actively reduce the total resistance (R) measurable from the outside via the temperature measuring interface (4).

6 Claims, 1 Drawing Sheet

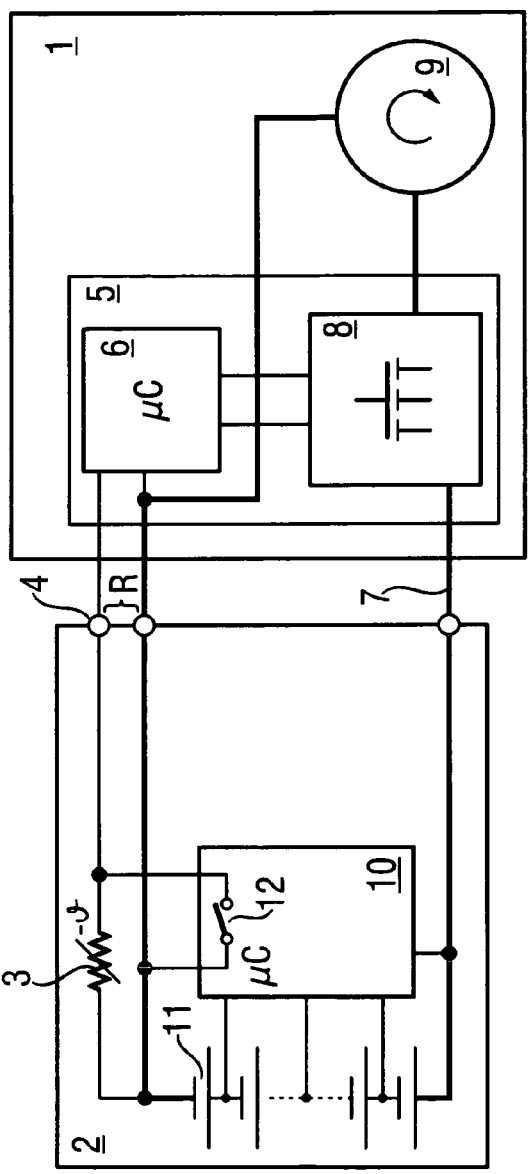
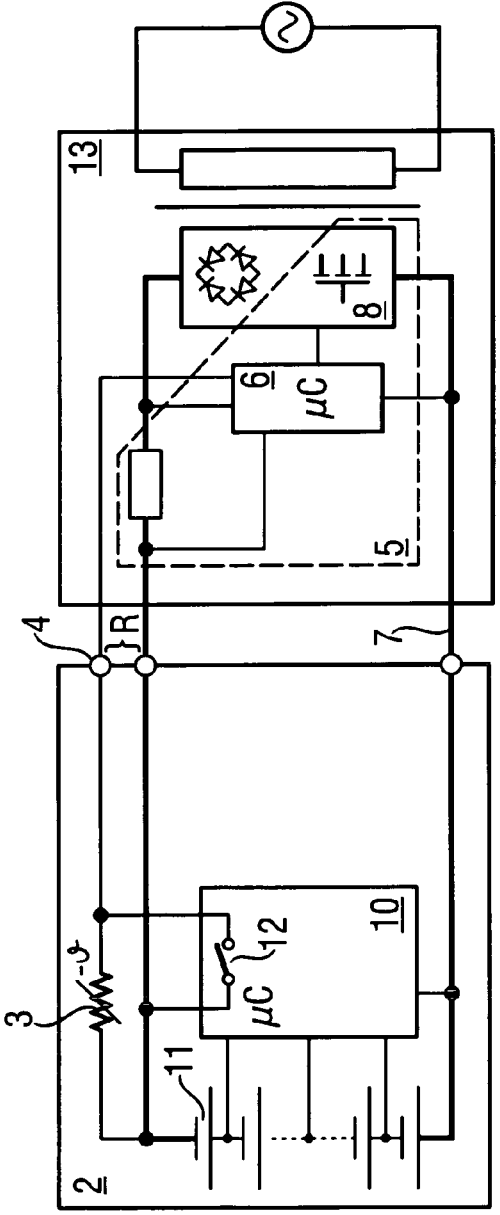
Fig. 1
Fig. 2

BATTERY PACK FOR HAND-HELD ELECTRIC MACHINE TOOLS

BACKGROUND OF THE INVENTION

The invention is directed to a battery pack for hand-held electric machine tools.

Battery packs, particularly for hand-held electric machine tools with high power requirements such as drill hammers and hand-held circular saws, must be able to be recharged quickly to enable quasi-continuous use of the hand-held electric machine tool by exchanging another battery pack. Battery-specific limiting values, particularly temperature, must be taken into account when charging and discharging to achieve a sufficiently long life of the battery pack. For this purpose, the temperature of the battery pack is commonly monitored by a standardized analog temperature sensor, which is arranged in the battery pack and is constructed as a temperature-dependent resistor with a negative temperature coefficient. When a limiting value is exceeded, the current flow is interrupted by battery protection electronics with a power switch, such as a power MOSFET, arranged in the circuit path.

NiCd and NiMH battery packs for hand-held electric machine tools which are interchangeable from one manufacturer to another by standardized interfaces to the consumer or the charging device are well represented commercially. These NiCd and NiMH battery packs have a standardized analog temperature sensor, which is arranged in the battery pack and is constructed as a temperature-dependent resistor with a negative temperature coefficient. However, the protective function aimed at protecting the battery is achieved only when the battery protection electronics of the consumer and charging device are used and set correctly. Problems occur particularly due to the fact that the battery cells, e.g., NiCD cells, NiMH cells or the especially sensitive Li-ion cells, have identical geometric constructions but must be used differently with respect to the limiting values.

It is also known to arrange the battery protection electronics in their entirety in the battery pack. The high currents required in battery packs for hand-held electric machine tools generate considerable amounts of heat due to the internal resistance of the power switch, which increases temperatures. Reducing the internal resistance of the power switch through the use of special low-impedance power MOSFETs or a plurality of power MOSFETs connected in parallel, as is commonly done, is uneconomical particularly in view of the high piece numbers of battery packs, since a large quantity of battery packs is used for every hand-held electric machine tool during its useful life.

According to NL9201744, a hand-held electric machine tool that is powered by a battery pack has battery protection electronics. An analog temperature sensor is arranged in the battery and a battery protection logic and power switch arranged in the hand-held electric machine tool can be used to control the motor and act as a charging device. The battery has an externally accessible temperature measuring interface to the battery protection logic for measuring the battery temperature.

According to EP0448767, a battery pack for diverse consumers and a charging device connected thereto form modular battery protection electronics. A temperature sensor and the battery protection logic are arranged in the battery pack. The battery protection logic controls a power switch arranged in the charging device by digital serial control pulses of an electronic control interface. The digital control can be decoded only by the charging devices or consumers specifically associated with the battery and therefore can only function with these specific charging devices and consumers.

SUMMARY OF THE INVENTION

It is the object of the invention to provide a battery pack which can be produced economically and which with a hand-held electric machine tool and charging device forms battery protection electronics with an increased level of security.

This object is met in accordance with the invention by a battery pack which is constructed for a hand-held electric machine tool and a charging device, having an analog temperature sensor including a negative temperature coefficient and a temperature measuring interface which is accessible from the outside and by which battery protection electronics arranged in the hand-held electric machine tool and the charging device, and which have a battery protection logic and a power switch arranged in the circuit path of the battery pack can be influenced. The battery pack is provided with an emergency protection circuit which is connected in parallel with the analog temperature sensor and which, in emergency situations, can actively reduce the total resistance measurable from the outside by the temperature measuring interface.

The battery protection electronics of the consumer and of the charging device, respectively, can be influenced by the emergency protection circuit in that a temperature increase is simulated by the reduced total resistance through the total resistance which is actively reduced by the emergency protection circuit and which is measurable via the temperature measuring interface by the battery protection electronics. Accordingly, a second safety level is realized that is independent from the limiting values of the associated consumer and of the charging device that is associated in a standardized manner. This emergency protection circuit does not bring about a relevant development of heat within the battery pack.

The emergency protection circuit in its entirety can advantageously be constructed as an integrated circuit, for example, as a microcontroller, so that it can be used economically in high piece numbers.

The battery pack advantageously has internal Li-ion cells so that damage that would otherwise be possible as a result of improper use with these high-power battery cells, which are nevertheless sensitive to temperature limiting values, is reliably prevented.

BRIEF DESCRIPTION OF THE DRAWINGS

The invention will be described more fully with reference to the drawings, wherein:

FIG. 1 shows a battery pack with a hand-held electric machine tool in accordance with the invention; and FIG. 2 shows the battery pack with a charging device in accordance with the invention.

DETAILED DESCRIPTION OF THE INVENTION

FIG. 1 shows a battery pack 2 electrically connected to an associated hand-held electric machine tool 1, as consumer, having an analog temperature sensor 3 with a negative temperature coefficient. Battery protection electronics 5 arranged in the hand-held electric machine tool 1 comprise a battery protection logic 6 that is constructed as a microcontroller and a power switch 8 arranged in the circuit path 7 of the battery pack 2, which is constructed as a power MOSFET and connected in a controllable manner to an electric motor 9 driving the hand-held electric machine tool 1, can be influenced by a temperature measuring interface 4 accessible from the outside. An emergency protection circuit 10 constructed as a microcontroller is provided in the battery pack 2. This emergency protection circuit 10 is connected in parallel with the analog temperature sensor 3 and is connected in a measurable manner to a plurality of battery cells 11 constructed as Li-ion cells. In this manner, the voltage of every individual battery cell 11 is detected. The total resistance R resulting from the parallel connection of the analog temperature sensor 3 and the emergency protection circuit 10 with a shorting switch 12 parallel to the analog temperature sensor 3 is measurable from the outside via the temperature measuring interface 4. In emergencies, the total resistance is zero and simulates an infinitely high temperature that is registered by the battery protection electronics 5 and results in a safe interruption of the circuit path 7 by opening the power switch 8.

FIG. 2 shows the battery pack 2 with an analog temperature sensor 3 with a negative temperature coefficient that is electrically connected to an associated mains-supplied charging device 13. The battery protection electronics 5, which are arranged in the charging device 13 and which comprise the battery protection logic 6 and the power switch 8 that is arranged in the circuit path 7 of the battery pack 2, can be influenced by a temperature measuring interface 4 accessible from the outside. The total resistance R resulting from the parallel connection of the analog temperature sensor 3 and the emergency protection circuit 10 with a shorting switch 12 parallel to the analog temperature sensor 3 is measurable from the outside via the temperature measuring interface 4. In emergencies, total resistance R is zero and accordingly simulates an infinitely high temperature that is registered by the battery protection electronics 5 and results in a safe interruption of the circuit path 7 by opening the power switch 8.

What is claimed is:

1. A battery pack for an associated hand-held electric machine tool (1) and for an associated charging device (13), the battery pack comprising:
   a plurality of battery cells (11),
   an analog temperature sensor (3) with a negative temperature coefficient, and
   a temperature measuring interface (4), which is accessible from the outside of the battery pack for controlling an operation of battery protection electronics (5) arranged in the hand-held electric machine tool (1) and in the charging device (13),
   the battery protection electronics (5) having:
      a battery protection logic (6), and
      a power switch (8) arranged in the circuit path (7) of the battery pack,
   wherein the battery pack is provided with an emergency protection circuit (10) connected to each of the plurality of battery cells and connected in parallel with the analog temperature sensor (3) and which, in emergency situations, actively reduces to a zero value a total resistance (R) that is measurable from the outside via the temperature measuring interface (4), wherein the total resistance (R) which is actively reduced to the zero value simulates an infinitely high temperature that is registered by the battery protection electronics (5), and in response, the battery protection electronics (5) opens the power switch (8), thereby causing a safe interruption of the circuit path (7).

2. The battery pack of claim 1, wherein the emergency protection circuit (10) is constructed as an integrated circuit.

3. The battery pack of claim 1, wherein the battery cells (11) are constructed internally as Li-ion cells.

4. The battery pack of claim 1, wherein the emergency protection circuit includes a shorting switch to provide an electrical short across the temperature measuring interface.

5. A battery pack for an associated hand-held electric machine tool and for an associated charging device, the battery pack comprising:
   a battery including a plurality of battery cells;
   an analog temperature sensor coupled to the battery and having a negative temperature coefficient;
   a temperature measuring interface coupled to the analog temperature sensor and accessible from the outside of the battery pack wherein the temperature measuring interface is adapted to couple to battery protection electronics arranged in the hand-held electric machine tool and in the charging device, each battery protection electronics having a battery protection logic and a power switch, wherein the power switch is arranged in a circuit path of the battery pack; and
   an emergency protection circuit coupled to each of the plurality of battery cells and coupled in parallel with the analog temperature sensor and operable to provide an electrical short across the temperature measuring interface, wherein the emergency protection circuit, in emergency situations, actively reduces to a zero value a total resistance (R) that is measurable from the outside via the temperature measuring interface; and
   wherein the total resistance (R) which is actively reduced to the zero value simulates an infinitely high temperature that is registered by the battery protection electronics, and in response, the battery protection electronics opens the power switch, thereby causing a safe interruption of the circuit path.

6. The battery pack of claim 5, wherein the emergency protection circuit includes a shorting switch to provide the electrical short across the temperature measuring interface.

* * * * *